United States Patent
Börner

[15] 3,703,918
[45] Nov. 28, 1972

[54] HOUSEHOLD UTENSILS

[72] Inventor: Alfred Börner, Pickliebemer Str. 6, Dudeldorf, Germany

[22] Filed: Feb. 16, 1970

[21] Appl. No.: 11,477

[30] Foreign Application Priority Data

Feb. 17, 1969 Germany..........P 19 07 858.1

[52] U.S. Cl. ..................83/425.3, 83/435.1, 83/858, 30/287
[51] Int. Cl. ................................................B26d 3/26
[58] Field of Search......146/169, 168, 170, 171, 162, 146/78 A

[56] References Cited

UNITED STATES PATENTS

| | | |
|---|---|---|
| 2,924,256 | 2/1960 | Reiland..................146/168 X |
| 940,830 | 11/1909 | Spenko......................146/168 |
| 1,003,674 | 9/1911 | Veitch.......................146/168 |
| 2,250,028 | 7/1941 | Miller........................146/169 |
| 2,441,027 | 5/1948 | Masrob..................146/169 X |
| 557,914 | 4/1896 | Struble et al. ..............146/171 |
| 2,522,143 | 9/1950 | Strassenburg..........146/151 X |

FOREIGN PATENTS OR APPLICATIONS 167,469 1/1951 Australia...................146/171

Primary Examiner—Willie G. Abercrombie
Attorney—Robert W. Beach

[57] ABSTRACT

A household utensil for cutting vegetables or fruit into strips includes a base plate having several parallel vertical blades projecting upward from the base plate which are equidistantly arranged in one or more rows at an angle to the cutting direction. One or more horizontal blades spaced above the base plate extend over the working width of the utensil and are located beyond the vertical blades in the cutting direction. The product to be cut is moved backwards and forwards over the cutting arrangement. The front edge of each of the vertical blades is sharpened or beveled only on the side or face nearer the cooperating horizontal blade.

5 Claims, 5 Drawing Figures

PATENTED NOV 28 1972 3,703,918

Inventor:
Alfred Borner

Robert W. Beach
ATTORNEY

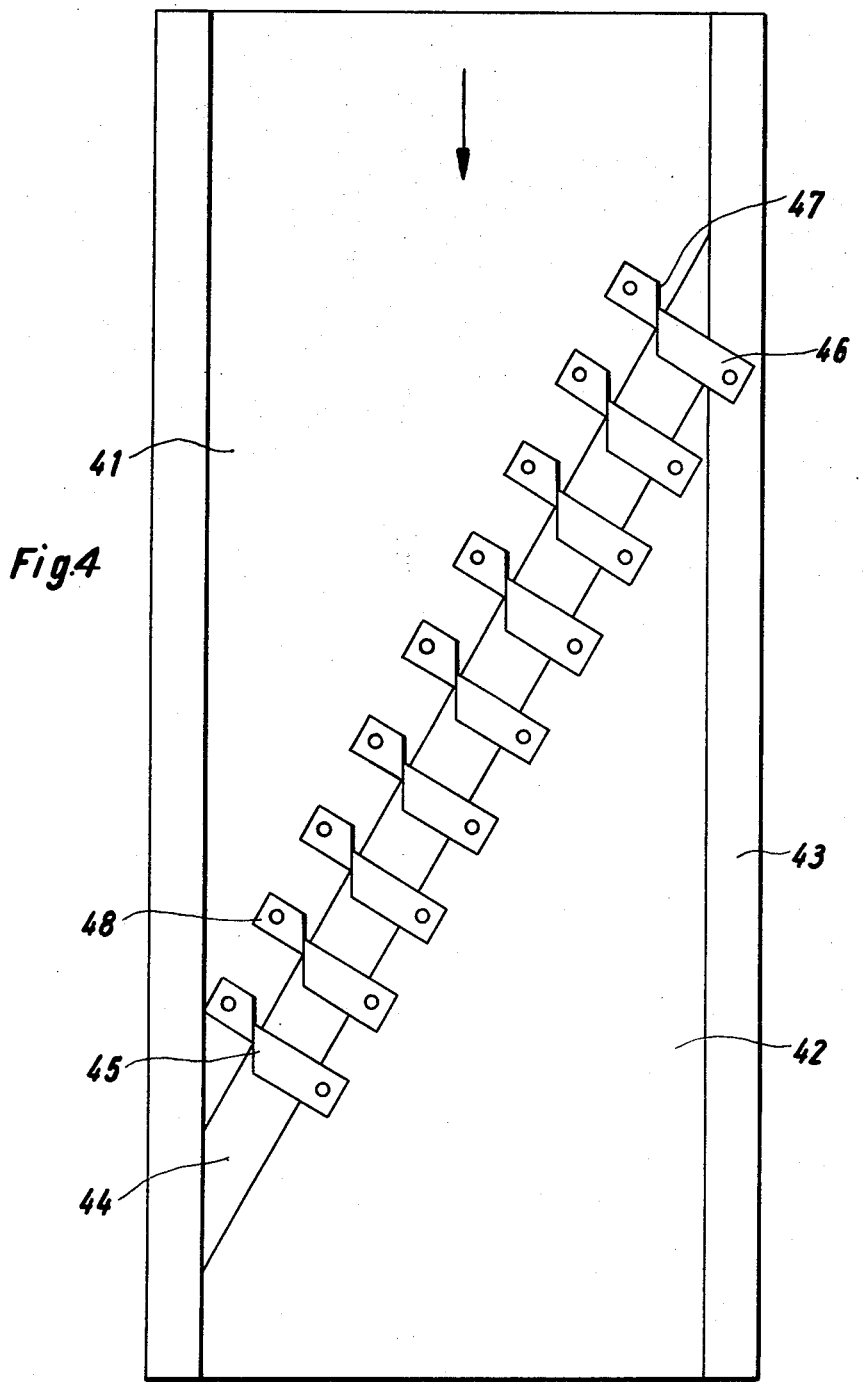

HOUSEHOLD UTENSILS

The present invention relates to a simple household utensil for cutting up potatoes or other vegetable or fruit into strips.

Various cutting devices are already known, some even simpler in construction, for cutting up potatoes, vegetables, fruit or similar products, with which it is possible to cut up passably good slices, cubes or strips. However, practical experience has shown that cutting, for example, of potatoes, which are to be prepared as french fried potatoes and therefore must be cut into strips requires that the utensil be extremely strong. Furthermore, the strips obtained with such utensils are not sufficiently uniform which, when preparing french fried potatoes, is disadvantageous because consumers do not like excessive variations in such products.

It is an object of the invention to provide a food strip cutter, more particularly a simple cutter for french fried potatoes, manipulation of which is very easy, cleaning of the utensil is quickly carried out and manufacturing costs are low. It is also an object to increase the cutting capacity with only a slight expenditure of force. Moreover, the cut strips are very regular.

To this end, the invention proposes that, in a utensil of the kind hereinabove referred to, the front edge of each of the vertical blades is sharpened or beveled only on the side or face nearer the cooperating horizontal blade.

Advantageously, the cutting edges of the vertical blade components extend upwardly at an angle from the base plate and the cutting edge of the horizontal part of the blades extends at an angle to the cutting direction. Moreover, the extension of the vertical part of the blades in the cutting direction may cross the cutting edge of the horizontal part of the adjacent blade.

In order that the invention may be more clearly understood, reference will now be made to the accompanying drawings, which show certain embodiments thereof by way of example, and in which:

FIG. 4 is a plan of a second embodiment of the invention.

Figure 1:
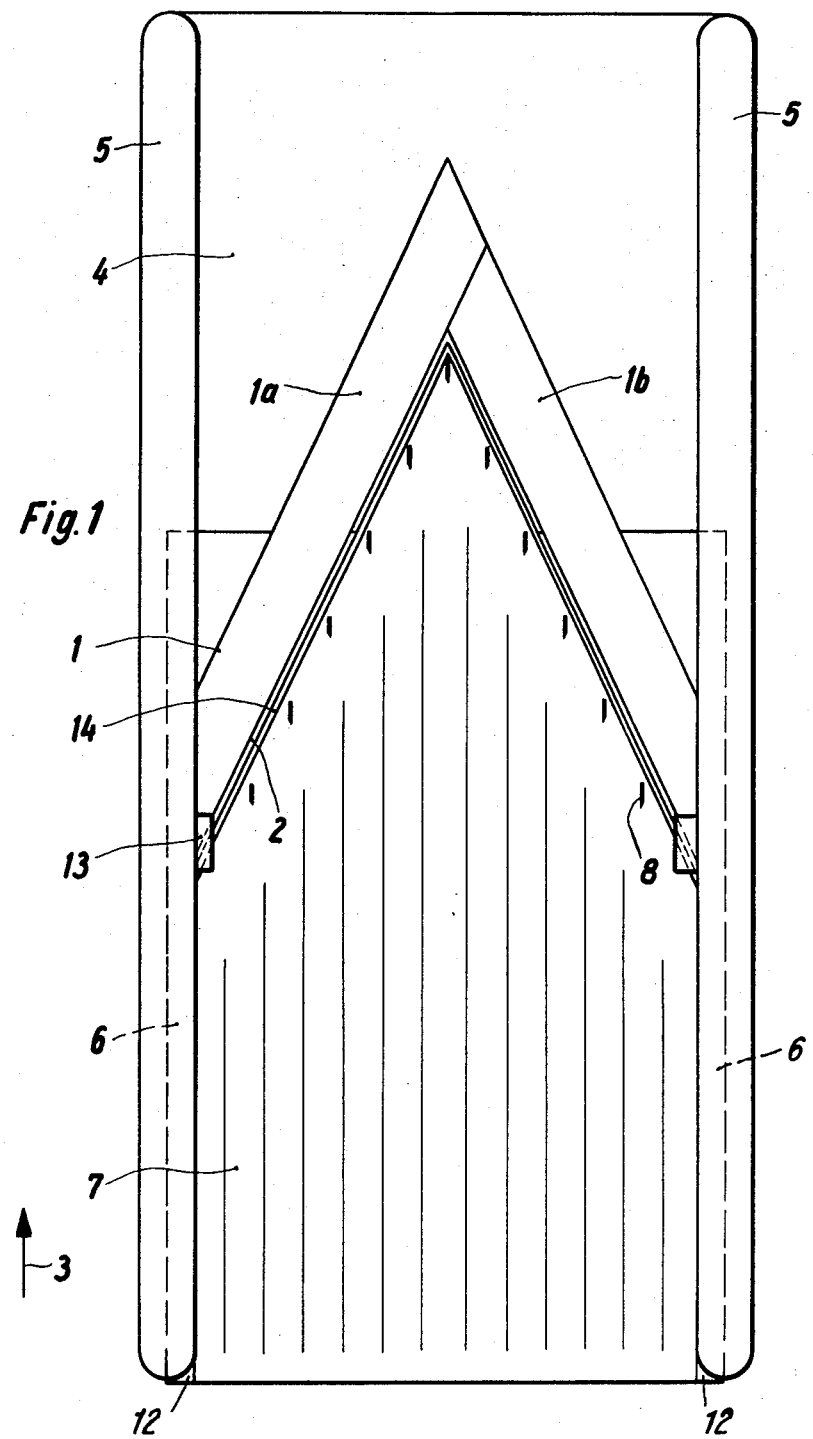
FIG. 1 is a plan of a utensil according to the invention.
Figure 2:
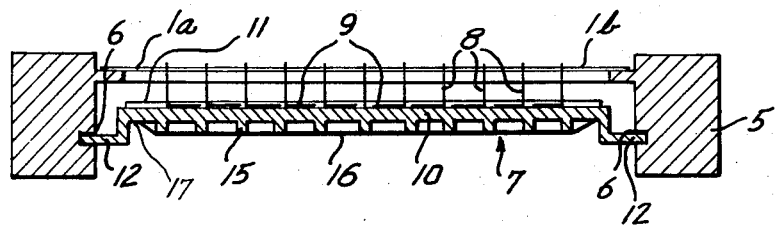
FIG. 2 is a transverse section through the utensil showing one displaceable base plate carrying vertical blades
Figure 2A:
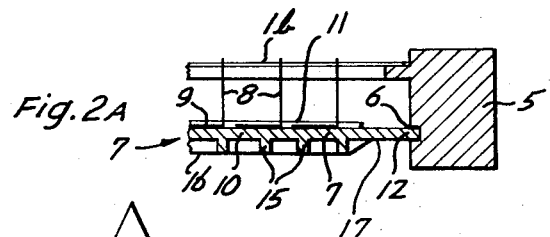
FIG. 2A is a similar section through a portion of the utensil showing a different displaceable base plate.
Figure 3:
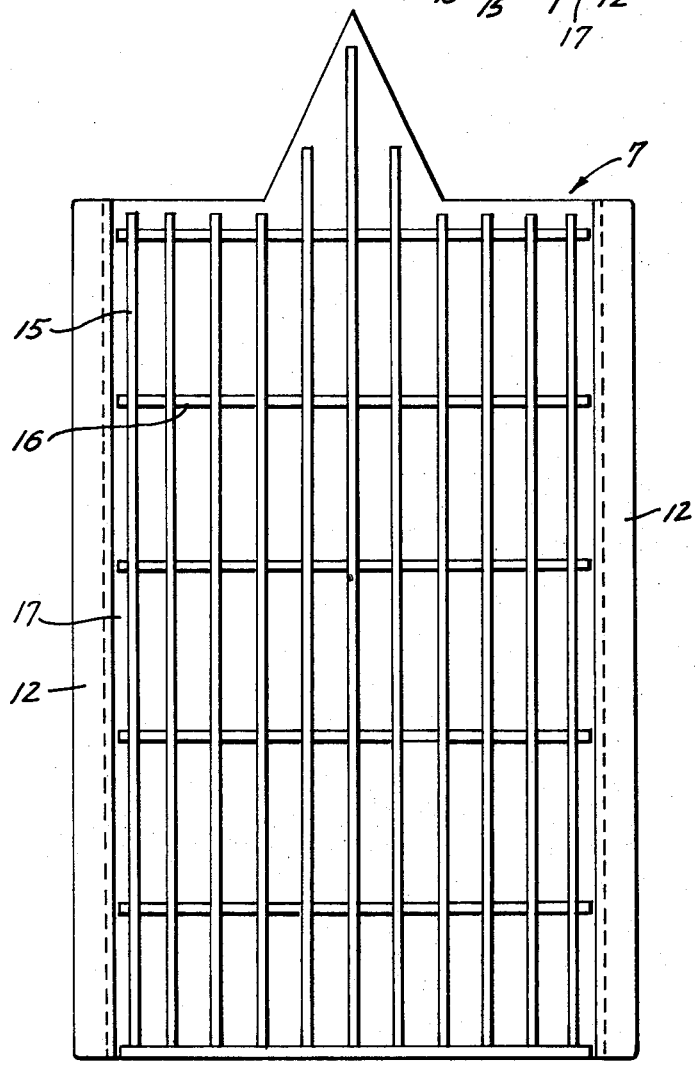
FIG. 3 is a plan of the side of the displaceable base plate not bearing the blades.

Referring now to the drawings, the household utensil food strip cutter according to FIGS. 1 to 3 consists of a horizontal blade 1 which may be composed of two parts 1a and 1b arranged at an angle to one another so that their cutting edges converge in the food-cutting direction. The cutting edge 2 of the horizontal blade 1 runs at an angle to the direction of cut which is shown by an arrow 3.

The horizontal blade 1 is held in place by a support plate 4 whose surface abuts the horizontal blade and is in contact with the blade surface. The support plate 4 is laterally defined by edge strips 5 forming an open framework. These edge strips are extended beyond the front end of the horizontal blade 1 and each has a longitudinal groove 6 on the inner side below the horizontal blade 1. A base plate 7 is slidable in the lateral longitudinal grooves 6 from the front, and carries several vertical parallel cantilever blades 8 upstanding from it spaced from one another and arranged in rows convergent in the food-cutting direction. Advantageously, the vertical blades 8 each have a bent foot attachment 9 which rests on a lower part 10 of the plate 7 and, as FIG. 2 shows, is covered by an upper part 11 of the plate which is rigidly connected to the lower part of the plate.

The horizontal knife or blade 1 is located beyond the vertical blades 8 adjacent to it in the cutting direction, and is inclined relative to the cutting direction. The front cutting edge of each of the vertical blades 8 is sharpened or beveled only on its outer side or face, that is on the side closer to the blade 2 of the horizontal knife 1. Since the most forward vertical blade is located in the center with one of its sides facing the blade part 1a of the horizontal blade 1 and its other side facing the blade part 1b, such two sides of the blade are equidistant from the cooperating horizontal cutting blade parts and both sides of the cutting edge of such vertical blade are sharpened by being beveled.

The slidable base plate 7 carrying the vertical blades 8 has flanges 12 on its side edges which can be offset elevationally from the central portion of the plate and which engage the longitudinal edge grooves 6 of the framework 5. The distance between the upper surface of plate part 11 and the horizontal blade 1 depends upon the degree of offset between the strips 12 and the central portion of the base plate 7. For example, if a plate is being used with a relatively large offset, then the distance to the cutting knife 1 will be slight while with a small offset the distance to the horizontal cutting plate will be larger. While the thickness of cut is determined by this offset, the width of cut is determined, amongst other things, by the lateral distance between the planes of the adjacent vertical blades 8. If prismatic strips having a square cross-section are to be cut from the vegetable, as is required for example for french fried potatoes, then the lateral distance between the vertical blades 8 must be equal to the height of the portion of such vertical blades extending across the intermediate space between the upper surface of plate part 11 and the horizontal blade 1.

In order to make the utensil versatile by enabling strips of varying sizes to be cut, several interchangeable sliding base plates can provide variations in the spacing between the vertical blades, the height of the vertical blades and the distance between the upper surface of plate part 11 and the horizontal blade 1 is established by the offset or step height between the central portion of the base plate 7 and the lateral edge flanges 12.

Furthermore, it has proved advantageous to retain the slidable base plate inserted in position. Hooked connecting members 13 for this purpose are provided on the base plate adjacent to the edge, which hooked members engage over the horizontal blade. To assist the removal of the cut product through the opening provided behind the vertical and horizontal blades in the utensil, the upper surface of the plate 7 is stepped at 14 directly behind the vertical blades 8 to increase the space between the horizontal blade 1 and the base plate.

The underside of the base plate 7 can likewise be fitted with vertical blades and the base plate made reversible. It is, however, also possible to provide longitudinal ribs 15 and transverse ribs 16 on it for reinforcement of the surface 17. By inverting the base plate, such surface 17 forms a working surface for a product to be sliced. The slab cut is therefore achieved exclusively by the horizontal blade 1. With such a construction, the utensil can be used for cutting strips, particularly for cutting french fried potatoes, but can also be used for cutting slices of any type of vegetable or fruit.

When using the utensil, the product to be cut, for example a potato, may be placed in or held by a holder (not shown) therefor which is movable backwards and forwards over the cutting arrangement. Such holder may be of the type shown in FIGS. 1, 2 and 3 of my U.S. Pat. No. 3,583,454, which is set on the lateral edge strips 5 with the potato in it. The holder is then pushed in the direction of arrow 3 to press the potato against the vertical blades 8 which slit the lower portion of the potato in the holder in a vertical direction. As soon as the potato reaches the horizontal blade 1 it is cut in a horizontal direction. The strips thus produced fall downwardly through the opening located behind the blades. On account of the construction and arrangement of the vertical blades, cutting without great pressure is fast and easy. In particular the one-sided sharpening of the vertical blades has the effect that the parts cut are outwardly curved and cannot come into contact with the adjacent vertical blade. This cutting process is repeated until the potato is cut to the desired shape, the potato then being urged downwardly in the holder.

As already mentioned several interchangeable base plates are preferably provided for one utensil, for example, one plate for cutting strips having a cross-section of 3×3mm for obtaining so-called matchstick potatoes, one plate for obtaining a strip having a cross-section of 6×6mm for potatoes or vegetables of average hardness and another plate for obtaining strips having a cross-section of 9×9mm for ordinary french fried potatoes.

In the embodiment according to FIG. 4, again base plate 41 and a support plate 42 are provided which in this instance are held by means of side strips 43. An opening 44 is located between the plates 41 and 42. The blade-support plate 42 is located higher than the base plate 41.

The blades 45 used in this embodiment are bent so that both ends of each blade are held, i.e., the end portion of the bent horizontal part 46 is connected to the blade-support plate 42, while the foot 48 of the blade projecting from the vertical part 47 is held in the base plate 41. The cutting edge of each upright blade portion 47 merges with the cutting edge of each horizontal blade portion substantially at a point. Also in this embodiment the vertical blades 47 are sharpened on one side. The blade can be cut from a long strip, which, before it is divided up, may have one entire edge sharpened, which considerably simplifies the manufacture.

The arrangement of the blades in the food strip cutter of FIG. 4 may, as in the preceding embodiment, be V-shaped. It is, however, also possible, as shown in the drawings, to arrange the blades in a diagonal row. The blades in the embodiments of FIGS. 1 to 3 could also be arranged in a single diagonal row.

All the components of the utensils described, other than the blades, are advantageously made from a synthetic plastic material which is easy to clean and does not corrode. The blades are made from stainless steel, the cutting edges of all the horizontal blades being sharpened or beveled on the underside.

I claim:

1. A cutting utensil for cutting vegetables, fruit and similar articles, comprising supporting means having a cavity therein and a single pair of cooperating guide grooves, the grooves of said pair being located in the opposite sides of said cavity, respectively, and opening toward each other, a plurality of base plates, each having several upright cutting blades upstanding therefrom and having their lower portions anchored permanently in such base plate, the cutting blades permanently anchored in one base plate being of a length and spaced apart distances different from the lengths and spacings of the upright cutting blades permanently anchored in another base plate for cutting such vegetables, fruit or similar articles into pieces of different size, said base plates having flanges along their opposite edges for reception selectively in said respective grooves of said supporting means, horizontal blade means carried by said supporting means at the discharge side of the upright cutting blades of a base plate having its flanges received in the grooves of said supporting means and cooperating with such upright blades for severing from an article portions thereof already slit vertically by said upright blades, the flanges on different base plates being located differently, respectively, to dispose the different base plates at different elevations relative to said horizontal cutting blade means when their flanges are received in said grooves of said supporting means.

2. The cutting utensil defined in claim 1, a side of the base plate opposite the upright cutting blades having crossed ribs thereon for stiffening the base plate.

3. the cutting utensil defined in claim 1, a base plate being recessed at the discharge side of the upright cutting blades.

4. A cutting utensil for cutting vegetables, fruit and similar articles, comprising an upper plate and a lower plate offset elevationally and having parallel edge portions providing a slot therebetween, and a plurality of blade means spaced along said slot toward which an article can be moved for cutting, each of said blade means including an upright blade element and a horizontal blade element joined to the upper end of said upright blade element, said blade elements in combination forming a strip, said upright blade element of each strip having its lower portion joined to said lower plate and a portion of said horizontal blade element of such strip remote from said upright blade element being joined to said upper plate.

5. The cutting utensil defined in claim 4, in which the upright blade element of each strip is inclined from the lower plate upwardly and in the direction of such movement of he article and the horizontal blade element is inclined with respect to such upright blade element from the upper end of the upright blade element to the upper plate in the direction of such movement of the article.

* * * * *

UNITED STATES PATENT OFFICE
CERTIFICATE OF CORRECTION

Patent No. 3,703,918     Dated November 28, 1972

Inventor(s) Alfred Börner

It is certified that error appears in the above-identified patent and that said Letters Patent are hereby corrected as shown below:

Column 4, line 36, cancel "a" and insert --the--; same line, cancel "the" (second instance) and insert --a--; line 39, cancel "the" and insert --The--; line 59, cancel "he" and insert --the--.

Signed and sealed this 1st day of May 1973.

(SEAL)
Attest:

EDWARD M. FLETCHER, JR.         ROBERT GOTTSCHALK
Attesting Officer               Commissioner of Patents